United States Patent [19]

Vardi et al.

[11] 4,359,878
[45] Nov. 23, 1982

[54] INSULATING MEANS FOR USE IN ABSORPTION REFRIGERATORS

[75] Inventors: Isaih Vardi, Rehovoth; Joseph Bourne, Raanana; Jonathan Ben-Dror, Hadar Am; Yigal Kimchi, Ramat Gan, all of Israel

[73] Assignee: Eshel Residual Energy for Cooling and Heating Ltd., Yavne, Israel

[21] Appl. No.: 246,843

[22] Filed: Mar. 23, 1981

[30] Foreign Application Priority Data

Mar. 25, 1980 [IL]    Israel ........................................ 59706

[51] Int. Cl.³ .............................................. F25B 15/00
[52] U.S. Cl. ...................................................... 62/476
[58] Field of Search ........................................... 62/476

[56] References Cited

U.S. PATENT DOCUMENTS 3,624,706  11/1971  Leonard, Jr. ......................... 62/476
3,977,211  8/1976   Bourne ................................. 62/476
4,246,762  1/1981   Bourne ............................... 62/476 X Primary Examiner—Lloyd L. King
Attorney, Agent, or Firm—Fleit & Jacobson

[57] ABSTRACT

The present invention relates to improvements in absorption type refrigeration devices of the type using lithium chloride or lithium bromide/water cycle.

According to the present invention there is provided an internal partition structure between different functional elements of a machine of this type, comprising two wall sections, separated from each other by an adequate space to provide thermal insulation, said air-space being provided with an opening towards the inside of the container, said opening beind shielded against penetration of liquid (as such or as spray).

5 Claims, 3 Drawing Figures

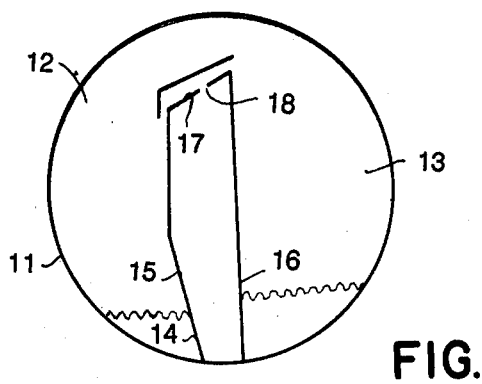
FIG. 1
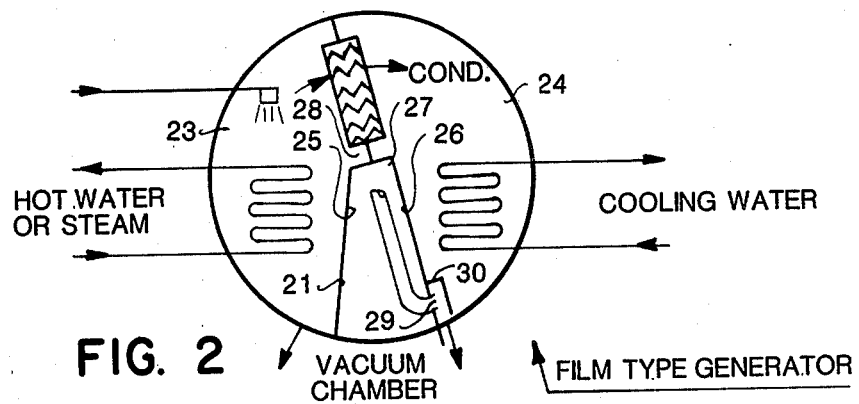
FIG. 2
FIG. 3
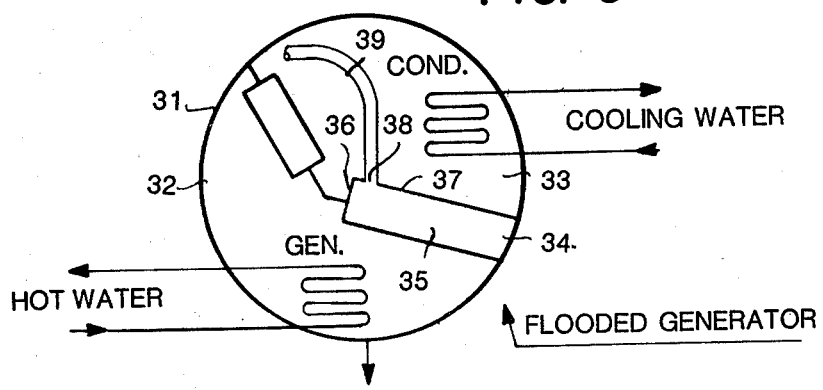

INSULATING MEANS FOR USE IN ABSORPTION REFRIGERATORS

FIELD OF THE INVENTION

The present invention relates to improvements in absorption refrigeration machines of the type based on a lithium/halide water (lithium bromide and/or lithium chloride-water) cycle or another absorbent. In this type of machine there is provided an absorber and evaporator in the same housing, an upright structure extending up to a certain height in said compartment allowing free flow of vapor. Substantial heat losses take place at this structure and these reduce the overall efficiency of the machine to an intolerable extent. The present invention relates to improvements of such machines which are intended to overcome the above problem.

BACKGROUND OF THE INVENTION

In absorption type machines of the type using a lithium halide (bromide and/or chloride) and water cycle various functional elements are generally provided in the same housing. For example an absorber and an evaporator are frequently provided in the same housing. In another part of the machine (film type generator) there is provided a generator section and a condenser section in the same housing. In flooded type generators a condenser and a generator section is provided in the same housing. Functional sections of this type ought to be separated thermodynamically from each other so as to prevent heat losses. When only a metal sheet partition is provided as boundary between the different functional sections, unbearable heat losses occur and these lead to a very pronounced reduction of overall efficiency.

According to a known solution of this problem, there is provided an elongated air space, open to the outside, the two boundaries of which form a partition between part of the absorber and the evaporator sections of a device of this type, with a metal-sheet partition extending upwards of this space. This type of solution is not entirely satisfactory as only part of the heat losses is obviated.

SUMMARY OF THE INVENTION

According to the present invention there is provided an improvement in absorption type refrigeration machines of the type using a lithium halide/water (lithium bromide/and or chloride-water) cycle, which improvement is adapted to substantially reduce thermal losses from one part of a given container to another part, housing different functional elements of such machines.

According to the present invention there is provided an internal partition structure between different functional elements of a machine of this type, comprising two wall sections, separated from each other by an adequate space to provide thermal insulation, said air-space being provided with an opening towards the inside of the container, said opening being shielded against penetration of liquid (as such or as spray).

According to a preferred embodiment of the invention the partition compartment comprises two upright sheet metal members welded to the bottom of the housing, provided with a member at the top bridging the said upright members, an opening being provided in the upper member, and a baffle above same preventing entry of liquid spray into the said compartment. A typical air-space in such compartment is from 1" to 6", depending on the size of the machine. An upright partition compartment is advantageously provided in a housing of the absorber and evaporator sections. A similar compartment can be provided in a film type generator between the generator and the condenser sections, the shielded opening being provided at any desired suitable location.

According to another embodiment of the invention, a partition compartment of this type is provided in a flooded generator type machine, said compartment extending in the housing of the generator and the condenser and extending in an inclined direction between the two functional sections of the compartment.

The separator compartments according to the invention are arranged inside the compartments of the absorption refrigeration machines, and they are provided with an opening towards the inside for equalizing the pressure in the device, said opening of the separation compartment being shielded against the penetration of liquid into the partition compartment.

DESCRIPTION OF THE PREFERRED EMBODIMENT

The invention is illustrated with reference to the enclosed schematical drawings, which are not according to scale, and in which:

FIG. 1 is a sectional side view of a housing of an absorber and evaporator;

FIG. 2 is a sectional side view of a film-type machine illustrating a housing of a generator and condenser sections:

FIG. 3 illustrates a flooded type machine showing a housing of a generator and a condenser section.

As shown in FIG. 1, there are arranged in housing 11 an absorber section 12 and an evaporator section 13. Between these there is provided an insulating compartment 14 according to the invention which comprises two upright members 15 and 16, which are attached at the bottom to the lower part of the container 11 and which extend along the entire length of the tubular compartment 11, which are bridged at the top by member 17, provided with an opening 18 for equalizing the pressure in the structure 14 and the housing 11. Above the member 17, and adjacent same there is provided a shielding member 18 adapted to prevent penetration of liquid, also in spray form, into the compartment 14.

As shown in FIG. 2, an insulating compartment 21 is provided in the housing 22 which houses a generator section 23 and a condenser section 24. This compartment comprises the upright sections 25 and 26, defining an inner space 27, said members 25 and 26 being connected by upper member 28, there being provided an opening 29 for equalizing pressure, which is protected against entry of mist or spray into the space 27 by baffle structure 30.

FIG. 3 illustrates a flooded type generator, and here there is provided in housing 31 a generator 32 and a condenser 33, there being provided an insulating chamber 34 according to the invention which comprises wall members 35, 36 and 37, and which is attached to the wall of the housing 31. There is provided an opening 38 for equalizing pressure between the housing 31 and the chamber 34, which is protected against penetration of mist by tube 39. The insulating chambers are efficient and constitute an adequate insulation to substantially reduce heat losses from one section of the housing to the other, thus increasing substantially the overall efficiency of the device.

It is clear that the above description is by way of illustration only and that many variations and modifications of the shape, size and arrangement of parts can be resorted to without departing from the scope and spirit of the invention.

We claim:

1. An absorption type refrigeration device of the type using a lithium halide (bromide and/or chloride)/water cycle and having housings containing different functional elements of the device, wherein the improvement comprises, at least in one of the housings of different functional elements, a partition compartment provided between two of the different functional elements, said partition compartment comprising two wall members totally encompassed within the housing and defining an inner insulating space therebetween, an opening being provided towards the inside of the compartment for communicating the inner insulating space with the remainder of the interior of the housing; and means for shielding said opening against the penetration of liquid into the inner insulating space of the partition equipment.

2. A device according to claim 1, wherein the partition compartment comprises an elongated structure defined by two sheet metal members welded to the housing, and extending throughout a larger part of the internal space of the housing and, a member bridging said members and hermetically welded to same.

3. A device according to claim 2, where the opening is provided in the bridging member, said means for shielding comprising a baffle provided above said opening.

4. A device according to claim 1 wherein the partition compartment extends in an inclined position between generator and condenser sections of a flooded generator type absorption machine.

5. A device according to claim 1, wherein the device has absorber and evaporator units within one housing, the separation compartment being provided between the absorber and the evaporator units.

* * * * *